INVENTOR.
CECIL J. BECKLEY

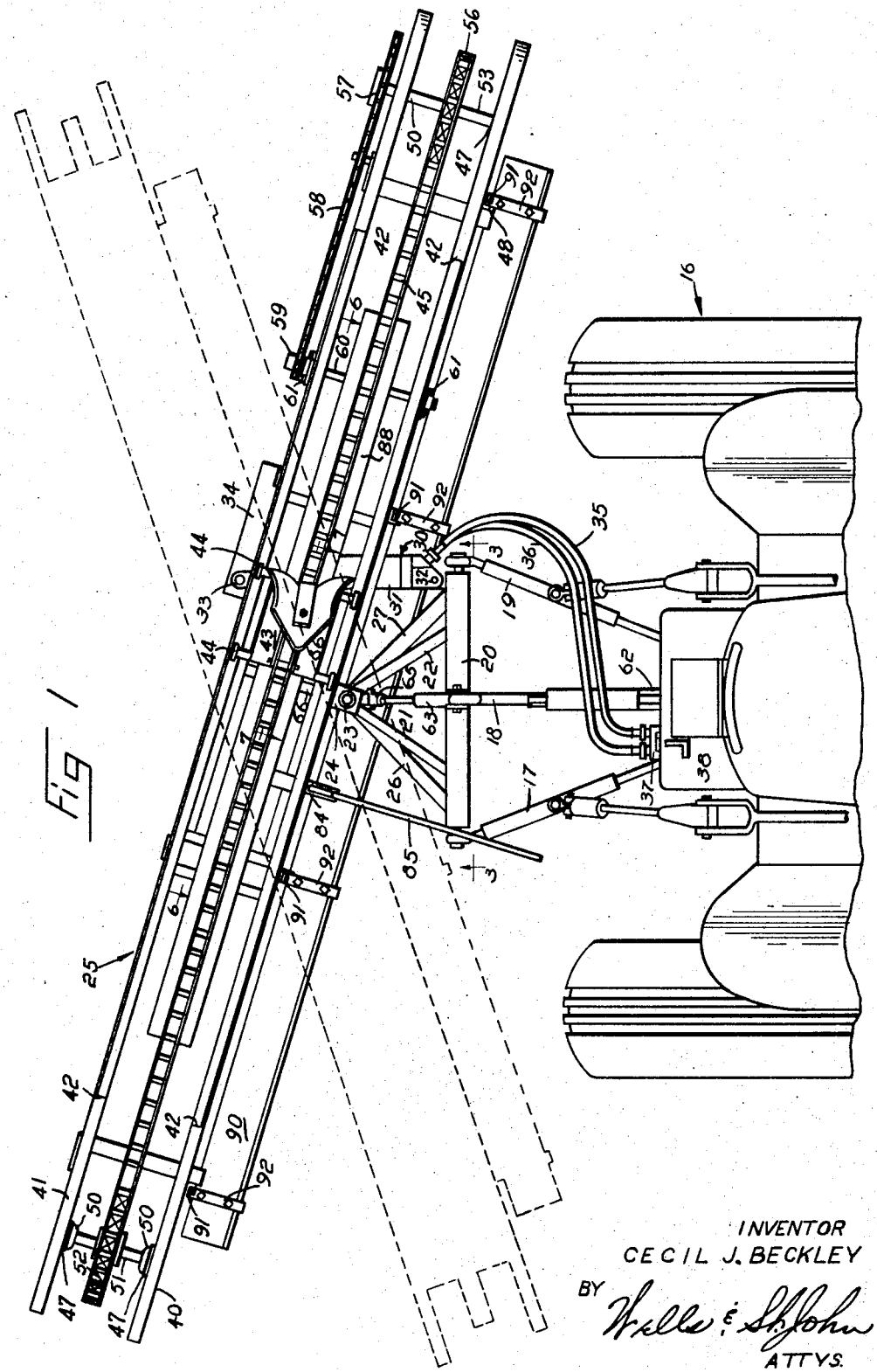

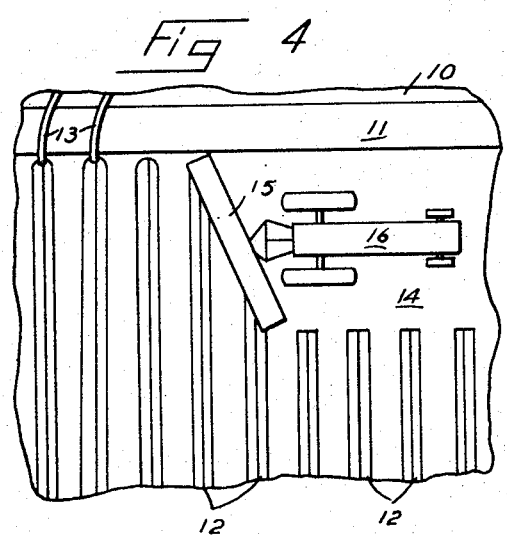
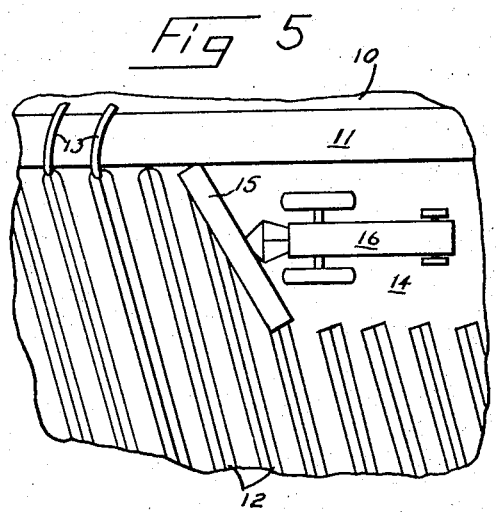
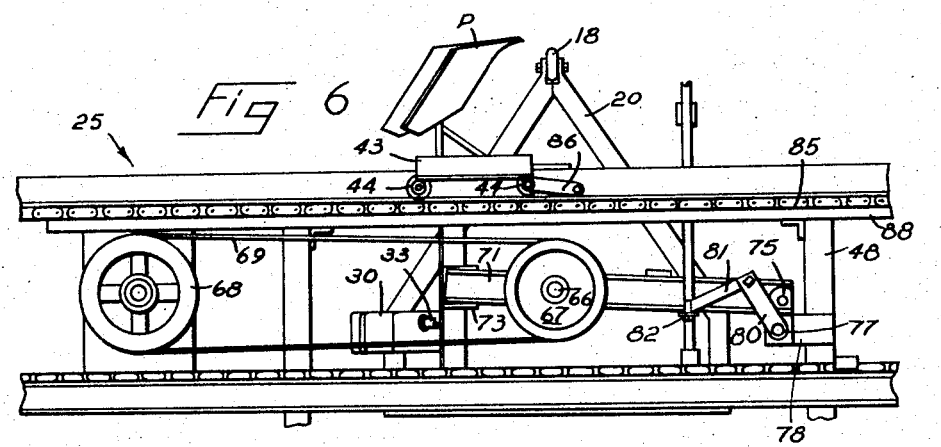
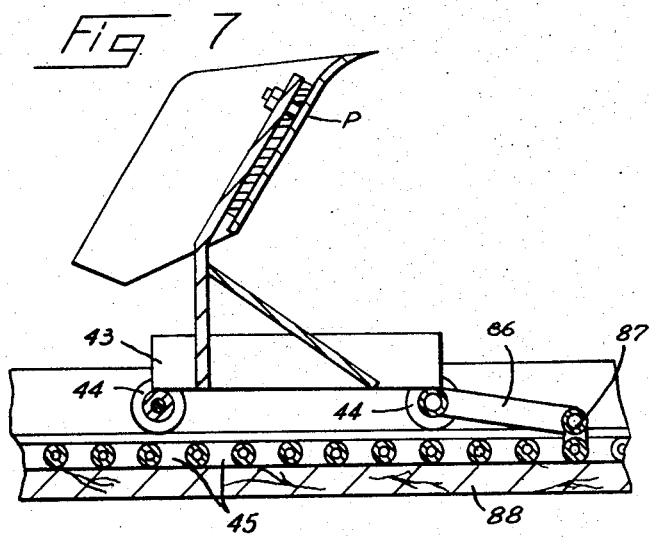
INVENTOR
CECIL J. BECKLEY
ATTYS.

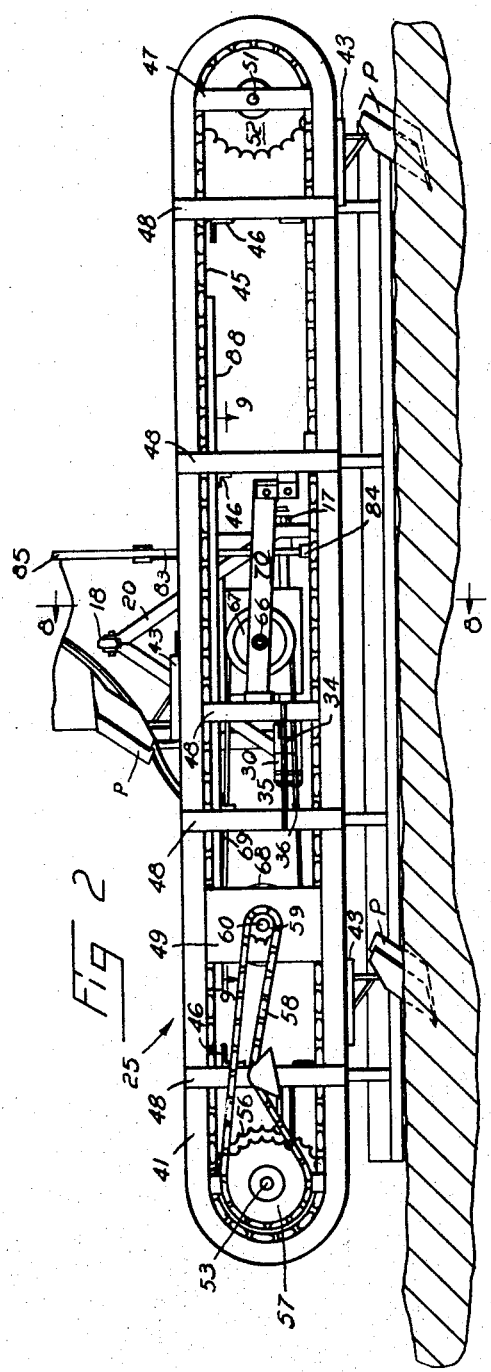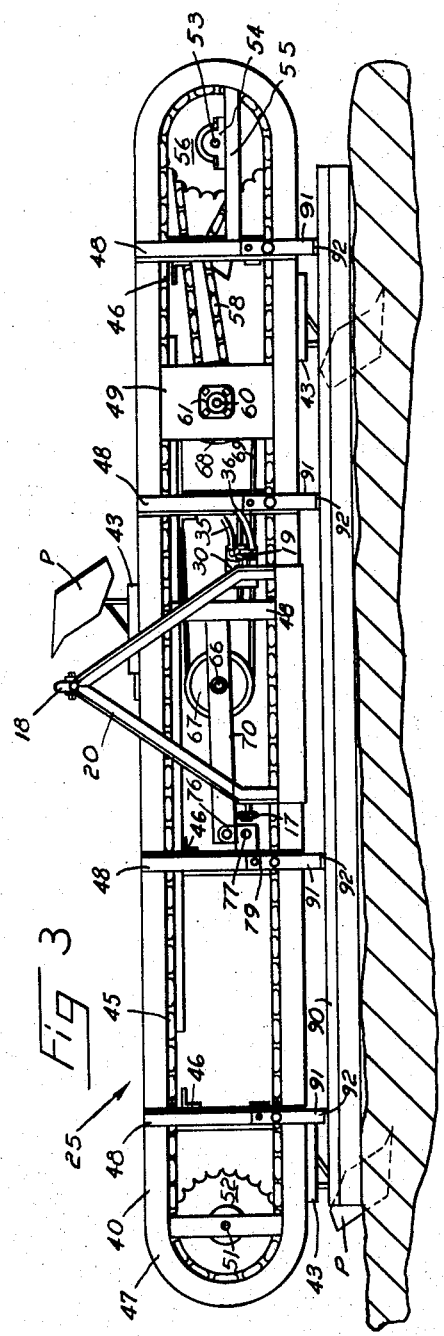

United States Patent Office 3,454,102
Patented July 8, 1969

3,454,102
CROSS PLOW CORRUGATOR
AND CULTIVATOR
Cecil J. Beckley, Star Rte. East,
Othello, Wash. 99344
Filed Nov. 8, 1965, Ser. No. 506,783
Int. Cl. A01b 33/00, 35/20, 39/12
U.S. Cl. 172—100                                    5 Claims

ABSTRACT OF THE DISCLOSURE

An implement for extension of field irrigation ditches across a headland area. A cross frame is movably carried by a towing tractor. It supports and guides a plow assembly carried along an upright endless path extending along the full length of the cross frame. By varying the speed of the plow assembly and the angular position of the cross frame, it is possible to match the ditch extensions and the previously formed ditches during continued movement of the tractor.

---

Figure 8:
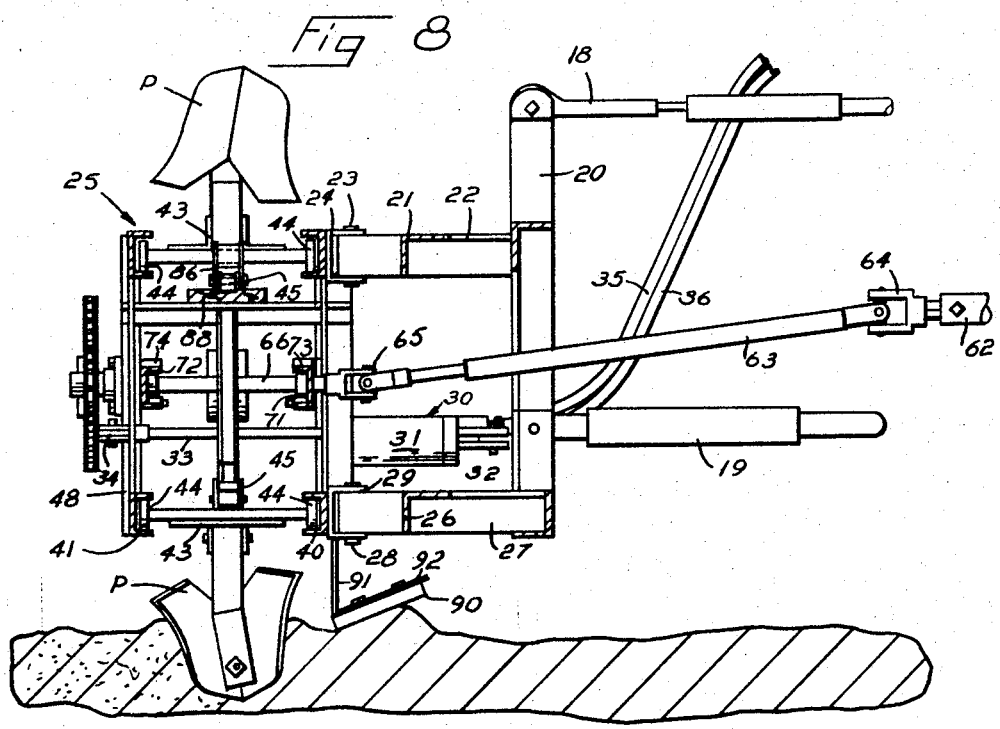

My invention relates to an implement particularly adapted for cross plowing corrugations as it is drawn across the field by a power vehicle. It is also useful in cultivation of headlands, etc.

It is the purpose of my invention to provide a machine of the character described embodying a cross frame with means for mounting it on a towing vehicle, and with means, operable from the towing vehicle while the vehicle advances, to vary the angle of the cross frame with respect to the direction of travel of the vehicle, and wherein the cross frame includes one or more plows movable around the cross frame transversely of the direction of travel and, means to drive said plows.

It is a further object of this invention to provide a machine of the character described with means to vary the speed of cross travel of the plows while the machine is being advanced by the towing vehicle.

The nature and advantages of my invention will appear more fully from the following description and the accompanying drawings of a preferred form of the invention.

Figure 9:
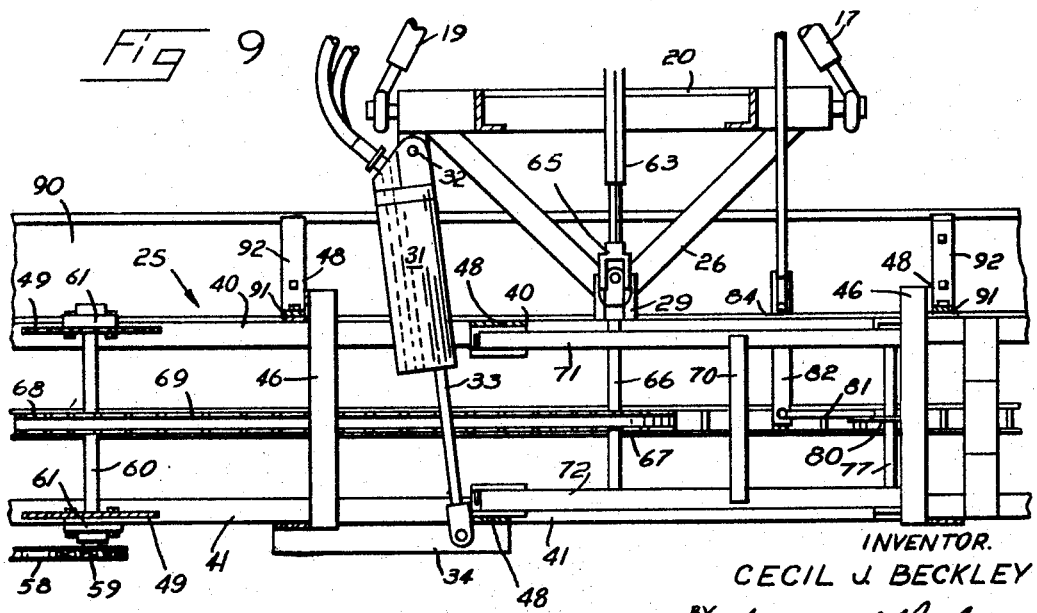

In the drawings:

FIGURE 1 is a plan view of the machine;
FIGURE 2 is a rear view of the machine;
FIGURE 3 is a front view of the machine looking rearwardly from the towing vehicle at line 3—3 of FIGURE 1, but with the cross frame at right angles to the direction of travel;
FIGURES 4 and 5 are diagrammatic views illustrating the relation of the machine to field corrugations and how it completes the corrugations across the headland to an irrigation ditch bank;
FIGURE 6 is an enlarged fragmentary sectional view taken on the line 6—6 of FIGURE 1;
FIGURE 7 is an enlarged fragmentary sectional view taken on the line 7—7 of FIGURE 1;
FIGURE 8 is an enlarged sectional view taken on the line 8—8 of FIGURE 2; and
FIGURE 9 is an enlarged fragmentary sectional view taken on the line 9—9 of FIGURE 2.

Referring now in detail to the drawings, my invention is embodied in a machine primarily adapted to plow out irrigation ditch corrugations in the headland along the main ditch. When these corrugations are formed the tractor pulling the corrugator plows cannot plow all the way to the ditch. It is necessary to smooth the headland area and complete each corrugation up to the ditch bank in order to use the well known siphon tubes for lifting the water over the ditch bank into the corrugation. In FIGURE 4 a ditch is indicated at 10, the ditch bank at 11 and the corrugations at 12. The siphon tubes are shown at 13. They are much too short to reach across the headland area 14. I use a cross plowing machine 15 which is propelled by a towing vehicle 16.

FIGURES 4 and 5 illustrate different conditions that may be encountered due to the slope of the land. The corrugations 12 in some places may be at a different angle to the ditch than at other places. My machines 15 is constructed with means whereby it can be made to plow out the corrugations across the headland without stopping even though these changes in angle occur. The corrugations across the headland may also be plowed out by the machine at an angle to the corrugations they join if the slope of the headland demands that this be done.

Referring now to FIGURES 1–3 and 6 to 9, the detailed construction of the machine will be described. The tractor 16 is provided with a conventional three point hitch including support arms 17, 18 and 19 that carry an upright frame 20. The frame 20 has upper arms 21 and 22 that extend rearwardly and toward each other and are joined at their rear ends. A pivot pin 23 pivotally connects these arms to a bracket 24 on an elongated cross frame 25. The frame 20 also has arms 26 and 27 extending rearwardly and toward each other and joined at their rearward ends. A pivot pin 28 connects these arms 26 and 27 to a lower bracket 29 on the cross frame 25. These two sets of arms are welded to the frame 20 and provide means to pivotally support the cross frame 25 on the frame 20 so that the cross frame 25 can turn about the pivot pins 23 and 28 (which are on a common axis), in a horizontal direction as indicated by the full line and dotted line positions in FIGURE 1 of the drawings. The cross frame 25 is turned and held at the desired angle with respect to the direction of travel of the towing tractor 16 by an hydraulic jack 30. This jack has its cylinder 31 pivoted on the frame 20 at 32 and has its piston rod 33 extended through the cross frame 25 and pivoted to a bracket 34 on the rear side of the frame 25. Flexible hydraulic hose lines 35 and 36 extend from the cylinder 31 to a source 37 of hydraulic fluid on the towing tractor 16 which is controlled by the operator through a lever 38. The details of the control valves and the pump and supply tank for the fluid are conventional and have not therefore been shown. The elongated cross frame 25 has a length greater than the width of the tractor 16 so that the ends of the cross frame extend outward from both sides of the tractor 16 as shown in FIGS. 1, 4 and 5.

The cross frame 25 comprises two spaced endless frame members 40 and 41 which are channel shaped in cross section throughout the bottom and end portions thereof, but have the top flanges of the channels cut away along the top portions thereof between the points 42 of each member as shown in FIGURE 1 of the drawings. The channels are open toward each other and provide guides for the wheels 44 for plow carriages 43. The plow carriages are drawn around the path provided by the frame members 40 and 41 by an endless chain 45. The frame members 40 and 41 are joined to each other by cross braces 46 and are braced further by pairs of upright braces 47 and 48 and plates 49. At the left end of FIGURE 1 the uprights 47 carry bearings 50 for a shaft 51 that has a sprocket wheel 52 thereon for the chain 45. At the right end of FIGURE 1 (left end of FIGURE 2) a shaft 53 is mounted in bearings 54 on frame members 55. This shaft 53 has a sprocket wheel 56 fixed thereon and engaged with the chain 45. The shaft 53 is the driven shaft for the chain 45 and carries a drive sprocket 57 thereon driven by a sprocket chain 58, which in turn is driven by a sprocket wheel 59 on a drive shaft 60. Bearings 61 for the shaft 60 are mounted on the plates 49.

Means are provided for driving the shaft 60 at various speeds from a power source such as the power take-off shaft 62 of the towing tractor 16. This means comprises an extensible shaft 63 leading from the power take-off, two universal joint couplings 64 and 65, and a shaft 66 having a variable diameter pulley 67 thereon which is connected to a pulley 68 by a V-belt 69. The pulley 68 is fixed on the shaft 60. The variable diameter pulley 67 is of well known construction. It can be made to decrease in diameter by increasing the pressure of the V-belt 69 thereon. To do this the shaft 66 is mounted on a frame 70 having side channels 71 and 72 that slide endwise in brackets 73 and 74 on the cross frame members 40 and 41. The channels 71 and 72 are pivoted at their ends remote from the brackets 73 and 74 on the upper ends of lever arms 75 and 76. These lever arms 75 and 76 are fixed on a rock shaft 77 which is pivotally mounted in bearings 78 and 79 that are carried on one pair of the upright braces 48. The rock shaft 77 has an arm 80 fixed thereto. The arm 80 is linked to an arm 82 on an upright shaft 83 by a link 81. The upright shaft 83 is carried by bearings 84 on the frame member 40. The shaft 83 has an arm 85 thereon which extends forwardly so that it can be grasped by the operator of the tractor vehicle 16.

The means just described enables the operator to move the pulley 67 toward and away from the pulley 68 and thus vary the pressure of the V-belt in the pulley 67 to cause a decrease or an increase in the effective diameter of the pulley 67 and thus drive the shaft 60 at variable speeds.

The plow carriages 43 have links 86 that extends to upstanding pivots 87 on certain links of the chain 45. The number of plow carriages used may vary, depending upon the length of the cross frame 25 and upon the nature of the work the plows are intended to do. The plows are indicated at P in the drawings. The chain 45 is supported through its top flight by a board 88.

In order to smooth the headland in advance of the corrugation thereof, I provide a leveler bar 90 along the front of the cross frame 25. This bar 90 is carried by a series of four brackets 91 that are bolted to the front upright braces 48. The brackets 91 are formed with forwardly and upwardly extending mounting portions 92 to raise the front edge of the bar 90 as shown in FIGURE 8.

When the machine is to be used for plowing out corrugations across headlands the operator positions the cross frame so that, upon starting, a plow P will be in the first corrugation 12 to be plowed out. Then advancing the tractor 16 as the plow moves crosswise he plows out this corrugation to the ditch bank 11. Since he can vary the speed of the travel of the tractor 16, the speed of crosswise travel of the plow P and the angle of the cross frame 25 with respect to the direction of travel of the tractor vehicle, he can plow out the several corrugations with a minimum of time loss. The leveler bar 90 prepares the soil in the headland area for the corrugations.

It is believed that the nature and advantages of my invention will be clear from the foregoing description.

I claim:

1. A cross plowing implement for attachment behind a towing vehicle such as a tractor for extending parallel and evenly spaced irrigation ditch corrugations to a ditch bank during movement of the towing vehicle transversely to the ditch corrugations along a path parallel and adjacent to the ditch bank, the plowing implement comprising:

an elongated cross frame;
adjustable mounting means operatively connected between the towing vehicle and cross frame by which the cross frame is supported on the towing vehicle for angular movement in a horizontal plane with respect to the towing vehicle and with the ends of the cross frame extending outward from both sides of the towing vehicle;
a plow carriage movably mounted on the cross frame, said plow carriage including a protruding plow;
means on the cross frame for supporting and guiding the plow carriage in an endless upright loop extending along the full length of the cross frame;
drive means on said cross frame operatively connected to said plow carriage for moving the plow carriage about its endless upright loop; and
control means operatively connected to said drive means and to said adjustable mounting means for varying the speed of the plow carriage along the cross frame and the angular position of the cross frame for forming parallel ditch extensions extending outward from the existing irrigation ditch corrugations to the ditch bank during continued movement of the towing vehicle along its path.

2. The invention defined in claim 1, together with a leveler bar on the cross frame operable to level the soil ahead of the plow.

3. The invention defined in claim 1 wherein the cross frame comprises fore and aft elongated endless channels guiding said plow carriage; and
a sprocket chain between said channels operably connected to said carriage to advance it along said channels.

4. The invention defined in claim 1 wherein the means to mount the cross frame to a towing vehicle comprises an upright frame having upper and lower rearwardly extending supports to which the cross frame is pivoted; and said interconnecting means comprises an hydraulic jack connected between the upright frame and the cross frame and spaced lengthwise of the cross frame from its pivotal mounting on said supports.

5. The invention defined in claim 1 wherein the speed varying means is mounted on said cross frame and has control means extending forwardly to the towing vehicle.

References Cited

UNITED STATES PATENTS

| | | | |
|---|---|---|---|
| 1,048,808 | 12/1912 | Bushong | 172—100 X |
| 2,948,345 | 8/1960 | Brewster | 172—49 |
| 1,221,458 | 4/1917 | Kohn | 172—100 X |
| 2,515,429 | 7/1950 | Smoot | 172—447 X |
| 2,968,355 | 1/1961 | Davis | 172—63 |

FOREIGN PATENTS

| | | |
|---|---|---|
| 271,314 | 5/1963 | Australia. |
| 92,932 | 3/1962 | Denmark. |
| 996,079 | 8/1951 | France. |
| 28,601 | 1/1908 | Sweden. |

ABRAHAM G. STONE, *Primary Examiner.*

STEPHEN C. PELLEGRINO, *Assistant Examiner.*